Figure 1:
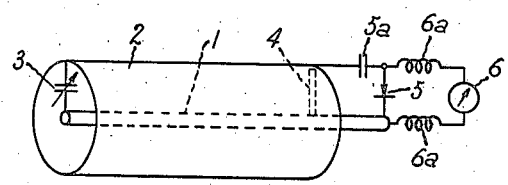

March 17, 1942.  T. SHIMIZU ET AL  2,276,743

WAVE METER

Filed Feb. 21, 1940

Inventors:
Toshiyuki Shimizu,
Shigenori Hamada,
by *Harry E. Dunham*
Their Attorney.

Patented Mar. 17, 1942

2,276,743

UNITED STATES PATENT OFFICE 2,276,743

WAVEMETER

Toshiyuki Shimizu and Shigenori Hamada, Tokyo, Japan, assignors to General Electric Company, a corporation of New York Application February 21, 1940, Serial No. 320,082
In Japan April 13, 1939

3 Claims. (Cl. 250—39)

Our invention relates to frequency responsive apparatus.

The objects of the invention include the provision of an improved, compact wave meter occupying little space and yet exhibiting high accuracy and simple to operate. A particular object of the invention is the provision of apparatus suitable for high frequency measurements. Other and further objects and advantages will become apparent as the description proceeds.

The present invention relates to an absorption type of wave meter, more particularly to wave meters adapted to the measurement of such short waves as decimeter waves or wave-bands adjacent thereto.

Resonating circuits for such short wave lengths cannot be formed consisting of the combination of ordinary concentrated inductance and capacitance as in the case of relatively long wave lengths. Wave meters for short wave lengths have been constructed in which the wave to be measured is applied to parallel conductors or Lecher lines, and in these instances the distance between loops of the standing current wave or voltage has been measured. In these instruments the length of the lines must be relatively long and an ammeter or short-circuiting conductor must be moved along parallel conductors and accurate measurement between loops is difficult. The present invention includes among its aims elimination of the need for bulky apparatus and the simplification of the process of making the measurement.

In accordance with the present invention coaxial cylindrical conductors are employed which serve in a sense as parallel conductors. However, the standing waves are not applied to these conductors as in the Lecher lines, but the conductors are used as the equivalent of concentrated inductance having a variable condenser or capacitance connected to them at one end, whereas at the other end the conductors are bridged by inductance or capacitance the voltage drop across which may be measured by means of a direct current instrument. The wave length is determined by adjusting the variable condenser until the maximum reading is obtained on the instrument, the condenser having a dial calibrated in terms of wave length.

The invention will be understood more readily from the following detailed description when considered in connection with the accompanying drawing and those features of the invention which are believed to be novel and patentable will be pointed out in the claims appended hereto. In the drawing Fig. 1 is a diagrammatic view of composite elements illustrating the principle of the present invention, and Fig. 2 is a side view of apparatus constituting an embodiment of the present invention, the side wall of the apparatus being omitted in order to expose the interior structure.

Like reference characters are utilized throughout the drawing to designate like parts.

Figure 2:
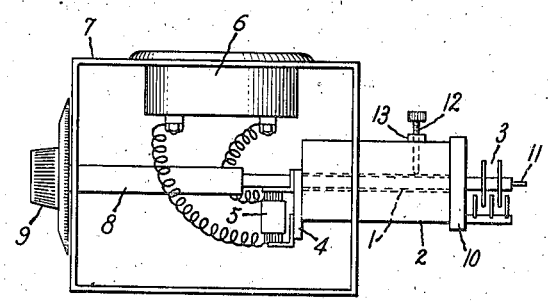

Referring to the drawing, Fig. 1 shows a wave meter embodying the present invention comprising parallel conductors in the form of coaxial cylinders consisting of an internal rod 1 of conducting material, an external conductor 2 in the form of a hollow cylinder composed of conducting material, a variable condenser 3 connected between the conductors 1 and 2 at one end thereof, an inductance consisting, for example, of a short metal piece 4 which bridges the conductors 1 and 2 at the remaining end, and a current responsive instrument 6 having terminals connected to the ends of the inductance 4. The current responsive instrument 6 may take the form of a direct-current ammeter having a rectifier 5 connected in its circuit, as in series with its terminals or bridging it. If desired, a fixed condenser 5a may be interposed between the rectifier 5 and the inductance 4, and fixed inductances 6a may be interposed between the instrument 6 and the rectifier 5 for eliminating high frequency surges from the direct current instrument 6.

It has been found that the reactanecs of the conductors 1 and 2 change their value to a certain extent according to variations of wave length of the current oscillations measured, but these conductors may be considered as one concentrated inductance. Consequently, in combination with the variable condenser 3 there is formed a resonating circuit and the resonating wave length may be made to vary in accordance with variations in adjustments of the condenser, the tuning of which is extremely sharp. The actual length of the conductors 1 and 2 in the arrangement illustrated is considerably less than the lengths of parallel conductors of the Lecher line type which can be used for measuring the same wave length. For example, in connection with Lecher lines, in the measurement of several tens of centimeters, conductors of several tens of centimeters long are required. In a wave meter of the type illustrated in the drawing, the conductors may be as short as several centimeters or several millimeters, thus making the apparatus exceedingly small and compact. Measurements are made in our apparatus simply by turning the dial of the variable condenser and it is unnecessary to move anything along the parallel conductors.

In the arrangement of Fig. 2 a metal casing 7 is provided and the external cylindrical conductor 2 is mounted on one wall of the casing 7 and extends therefrom, whereas the internal conductor 1 is supported coaxially within the conductor 2 in any suitable manner as by means of an insulating spacer 10. The spacer 10 also supports the variable condenser 3 which in this case is formed as a small type variable condenser, having a stationary plate or group of plates electrically connected to the external conductor 2, and a movable plate or group of plates electrically connected to the internal conductor 1 and supported thereby in any suitable manner. The inner end of the coaxial conductors 1 and 2 is bridged by a metal piece 4 which forms an inductance. A crystal detector or other suitable form of rectifier 5 is connected in parallel with the inductance piece 4 and the direct current ammeter 6 is connected in parallel with the rectifier 5, the ammeter 6 being of the panel type mounted in the top wall of the casing 7.

A long insulating rod 8 is provided which extends through the casing 7, is connected to the inner end of the internal conductor 1 and has attached thereto outside the casing 7 a dial 9 cooperating with suitable indicia, not shown, on the left-hand wall of the casing 7. The movable plate of the condenser 3 has an extending shaft 11 which acts as an antenna to receive waves to be measured. As has been described, the ammeter, rectifier and other parts are mounted within the casing 7, which may be composed of conducting material or have a conducting screen secured to it. Since the external conductor 2 is also mounted on the casing, the electrical waves do not directly influence the rectifier 5 or the instrument 6. Moreover, since the rectifier is so connected that the voltage drop across the bridging reactance 4 is applied thereto, the rectifier 5 and instrument 6 have substantially no reactive effect on the tuned circuit. The resonance or tuning curve is thus made so sharp as to reduce error in wave measurement to a minimum, for example, the error is readily made less than 0.1%. No ground connection is required as the condenser 3 is the equivalent of a loop to pick up the wave, the frequency of which is to be measured.

Although the invention is not limited to the use of particular dimensions it has been found that satisfactory results may be obtained in apparatus constructed to the following dimensions: the length of conductors 1 and 2, three centimeters with a characteristic impedance of 100 ohms; the inductance of the bridging piece 4, five times ten to the minus ninth henries; the minimum capacity of the condenser 3, between three and four micromicrofarads, and the maximum capacity of the same, between fifteen and sixteen micromicrofarads. The range of measurable wave length extends from approximately 50 to 100 centimeters.

In order to move the range of wave length toward the direction of shorter wave lengths either the length of conductors or the characteristic impedance may be reduced by providing an adjustable shunt or short-circuiting conductor 12 at an intermediate point in the external conductor 2, as shown in Fig. 2. The short circuit conductor 12 is so constructed that it may readily be forced in or out, so that it either makes contact with the internal conductor or is disconnected therefrom. For example, the conductor 12 may be in the form of a screw mounted in a tapped hole in a boss 13 on the cylinder 2. The effective length of the conductors 1 and 2 then becomes approximately the distance from the ends of the conductors to the short-circuiting shunt 12, thus reducing the wave lengths of the end points of the range of measurement. For example, if the conductor 12 is mounted approximately five millimeters from the outer ends of the conductors 1 and 2 to which the condenser 3 is connected, the range of wave lengths in the case of the apparatus for which specific dimensions were given above is reduced to the region between approximately twenty and fifty centimeters, thus making the entire range of the device from twenty to one hundred centimeters.

We have herein shown and particularly described certain embodiments of our invention and certain methods of operation embraced therein for the purpose of explaining its principle and showing its application but it will be obvious to those skilled in the art that many modifications and variations are possible and we aim, therefore, to cover all such modifications and variations as fall within the scope of our invention which is defined in the appended claims.

What we claim as new and desire to secure by Letters Patent of the United States is:

1. A wave meter comprising a casing having enclosing walls, a hollow cylindrical conductor secured to a wall of the casing and extending therefrom, a conductor mounted within said hollow cylindrical conductor substantially coaxially therewith, a variable condenser having relatively movable plates one of which is electrically connected to said internal conductor and the other of which is electrically connected to said external conductor at the ends of the conductors projecting from said casing, a reactance element connected between said conductors at the inner ends thereof within said casing, and a current responsive device mounted in said casing and electrically connected across said reactance element.

2. A wave meter according to claim 1 in which the internal conductor is rotatably mounted supporting the movable plate of the variable condenser and there is an insulating rod extending into the casing, connected at the inner end to the inner end of the internal conductor and provided at the outer end with an adjusting knob.

3. A wave meter comprising an internal conductor and an external conductor coaxially disposed, a variable impedance connected to the conductors at one end, a reactance element connected to the conductors at the other end in the form of a bar extending radially between the internal conductor and the external conductor, a current responsive device connected across the reactance element, and an adjustable bridging conductor transversely disposed at an intermediate point in the length of the internal and external conductors, adapted alternatively to bridge said internal and external conductors at said point or to be disconnected from one of them.

TOSHIYUKI SHIMIZU.
SHIGENORI HAMADA.